(12) United States Patent
Gamboa et al.

(10) Patent No.: US 8,002,503 B2
(45) Date of Patent: Aug. 23, 2011

(54) DEBRIS REMOVAL SYSTEM FOR CUTTING TOOLS

(75) Inventors: James D. Gamboa, Anaheim, CA (US); Christopher J. Erickson, Garden Groove, CA (US); Branko Sarh, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 1128 days.

(21) Appl. No.: 11/510,980

(22) Filed: Aug. 28, 2006

(65) Prior Publication Data

US 2008/0050193 A1 Feb. 28, 2008

(51) Int. Cl.
*B23B 35/00* (2006.01)
*B23B 47/28* (2006.01)

(52) U.S. Cl. .............. 408/1 R; 408/61; 408/67; 408/76; 408/97

(58) Field of Classification Search .............. 408/56, 408/57, 59, 67, 76, 95, 97, 1 R, 61, 98, 103
See application file for complete search history.

(56) References Cited

U.S. PATENT DOCUMENTS

| 1,651,353 | A | * | 12/1927 | Gedor | 408/97 |
| 1,857,748 | A | * | 5/1932 | Walker | 408/56 |
| 3,351,143 | A | * | 11/1967 | Seibold et al. | 175/209 |
| 4,915,550 | A | * | 4/1990 | Arai et al. | 408/56 |
| 4,917,547 | A | * | 4/1990 | Frederickson et al. | 408/1 R |
| 5,024,562 | A | * | 6/1991 | Arai et al. | 408/1 R |
| 5,356,245 | A | * | 10/1994 | Hosoi et al. | 408/56 |
| 5,482,411 | A | * | 1/1996 | McGlasson | 408/1 R |
| 6,200,075 | B1 | * | 3/2001 | Gaskin et al. | 408/67 |
| 6,413,022 | B1 | * | 7/2002 | Sarh | 408/76 |
| 6,905,291 | B2 | * | 6/2005 | Day et al. | 408/67 |
| 7,001,121 | B2 | * | 2/2006 | Kamphuis et al. | 409/132 |
| 7,195,429 | B2 | * | 3/2007 | Dods et al. | 408/67 |
| 2003/0170082 | A1 | * | 9/2003 | Garcia et al. | 408/1 R |

FOREIGN PATENT DOCUMENTS

WO PCT/US2007/018610 8/2007

\* cited by examiner

*Primary Examiner* — Daniel W Howell

(74) *Attorney, Agent, or Firm* — Tung & Associates

(57) ABSTRACT

A system for removing debris generated by a cutting tool draws the debris into a mixing chamber formed in a workpiece clamp where the debris is combined with a high velocity airflow. A vacuum source draws the debris-air mixture into a cyclonic airflow extraction chamber where the mixture is accelerated before being extracted from the clamp through an exhaust channel. A clamping ring seals the area surrounding the cutting site so that air velocity in the mixing chamber is increased and debris is accelerated into the extraction chamber.

31 Claims, 4 Drawing Sheets

DEBRIS REMOVAL SYSTEM FOR CUTTING TOOLS

FIELD OF THE INVENTION

This invention generally relates to cutting tools such as drills, and deals more particularly with a system for removing chips and other debris produced by cutting operations on a workpiece.

BACKGROUND OF THE INVENTION

Portable machine tools such as semi-automatic, portable drills are commonly used throughout industry for performing machining operations on workpieces. For example, portable drills are extensively used in the aircraft industry to produce countersunk holes that receive rivets attaching an outer skin to frame members. The drill is carried on a portable fixture that includes a clamp for clamping the fixture onto a workpiece so that the drill is held in a precise, fixed position throughout a drilling operation. The drill body is mounted on a slide on the fixture to allow a cutting tool such as a countersink drill bit to be fed in a drill stroke between a retracted position and a cutting position in which the drill bit engages the desired location on the workpiece.

During the drilling process, workpiece chips and/or dust is generated between the cutter and workpiece hole surface interface. The chips/dust not only reduce the quality of the hole, but also increase cutter wear and reduce cutter life. The dust generated during drilling of carbon fiber composites is particularly problematic because it functions as a "grinding material" at the cutter/workpiece interface, reducing hole quality and causing rapid cutter wear. Moreover, the carbon fiber dust can become an airborne hazard or contaminate that settles on factory floors and equipment, necessitating cleanup operations. It is therefore particularly important to quickly remove and contain the chips and dust as they are generated by the drilling operation.

In the past, automated drilling/fastening systems have employed directed air pressure to blow chips away from the drilling area, however this technique disperses the chips and dust into the air, resulting in potential airborne hazards and necessitating cleanup operations. In order to prevent carbon fiber dust from becoming airborne, it has been purposed to submerse the workpiece in a liquid such as water in order to trap the carbon dust. However this technique results in a water/dust emulsion which requires special treatment, handling and disposal. In some cases, the water seeps into gaps in the workpiece and must be removed prior to fastener installation.

From the forgoing, it can be appreciated that previous techniques used for removing chip debris and dust have not been completely effective, and/or have required secondary clean-up operations. Accordingly, there is a need for a debris removal system that overcomes these problems. The present invention is directed towards satisfying this need.

SUMMARY OF THE INVENTION

According to one aspect of the invention, a device is provided for removing cutting debris produced by a cutting tool performing cutting operations on a work piece. The device comprises a clamping member for clamping the tool to the work piece; a chamber in the clamping number for receiving debris produced by the cutting tool; fluid inlets communicating with the chamber for allowing the fluid to enter the chamber; and, at least one exhaust outlet communicating with the chamber for allowing fluid and debris to exit the chamber. A vacuum source coupled with the outlet draws fluid and debris in the chamber out through the exhaust outlet. The chamber includes an enlarged diameter portion which encourages cyclonic flow of the fluid and debris before exiting the chamber. The clamp includes an electromagnet body having a clamping ring that seals the area surrounding the cutter-work piece interface so that all cutting debris is forced into the chamber. A closure is mounted for movement with the cutter which functions to close off one of the inlets as a cutting operation is commenced, thereby increasing the velocity of fluid and debris passing through the chamber.

According to another aspect of the invention, a debris removal system is provided for use with cutting tools comprising: a clamp for clamping the tool to a workpiece; a passageway through the clamp which communicates with the surface of the workpiece where a cutting operation is performed, and including a chamber for receiving debris produced by a cutting operation; first and second fluid inlets in the passageway for allowing the fluid to enter the chamber; an exhaust outlet in the passageway for allowing fluid and debris to exit the chamber; and, a vacuum source coupled with the exhaust outlet for exhausting fluid and debris from the chamber. Fluid entering the first and second inlets in the passageway carry the debris into the chamber where they are mixed with the fluid before being drawn away from the clamp through the exhaust outlet.

According to a further aspect of the invention, a cutting debris removal system is provided for a portable machine tool having a workpiece cutter, comprising: a clamp for clamping the portable machine tool to the workpiece; a passageway in the clamp through which the cutter may pass between a retracted position and a cutting position engaging the workpiece, the passageway including a chamber for receiving debris produced by the cutter; at least one fluid supply channel in the clamp communicating with the chamber for supplying fluid to the chamber; at least one fluid exhaust channel in the clamp communicating with the chamber for allowing fluid and debris to be exhausted from the chamber during a cutting operation; and, a pressure source for exhausting fluid from the chamber through the exhaust channel. The chamber preferably includes a first section for mixing fluid with the debris and a second circular section for encouraging cyclonic flow of the fluid and debris before passing into the exhaust channel. The clamp includes one side facing and spaced from the workpiece to form a gap between the clamp and the workpiece, and the fluid supply channel communicates with the gap. The clamp includes a ring surrounding one end of the passageway for sealing the gap from the chamber so that all of the debris produced by the cutting operation is directed into the chamber.

According to still another aspect of the invention, a method is provided for removing cutting debris produced by a cutting machine tool held on a workpiece by a clamp, comprising the steps of: introducing a flow of fluid into a passageway in the clamp; moving a cutter on the machine tool through the passageway into cutting engagement with the workpiece, resulting in cutting debris entering the passageway; and, exhausting the fluid and cutting debris from the passageway through a channel in the clamp. The fluid flow is preferably performed by sucking fluid into the passageway from fluid supply channels formed in the clamp. The method further comprises the step of mixing the fluid and the cutter debris in a chamber within the passageway before being exhausted from the clamp. The velocity of the fluid flowing through the passageway is increased when the cutter moves into cutting engagement with the workpiece. The increased fluid velocity is preferably performed by reducing the area of inlets allowing fluid to enter the passageway.

Various additional objects, features and advantages of the present invention can be more fully appreciated with reference to the detailed description and accompanying drawings that follow.

DETAILED DESCRIPTION OF THE PREFERRED EMBODIMENTS

Figure 1:
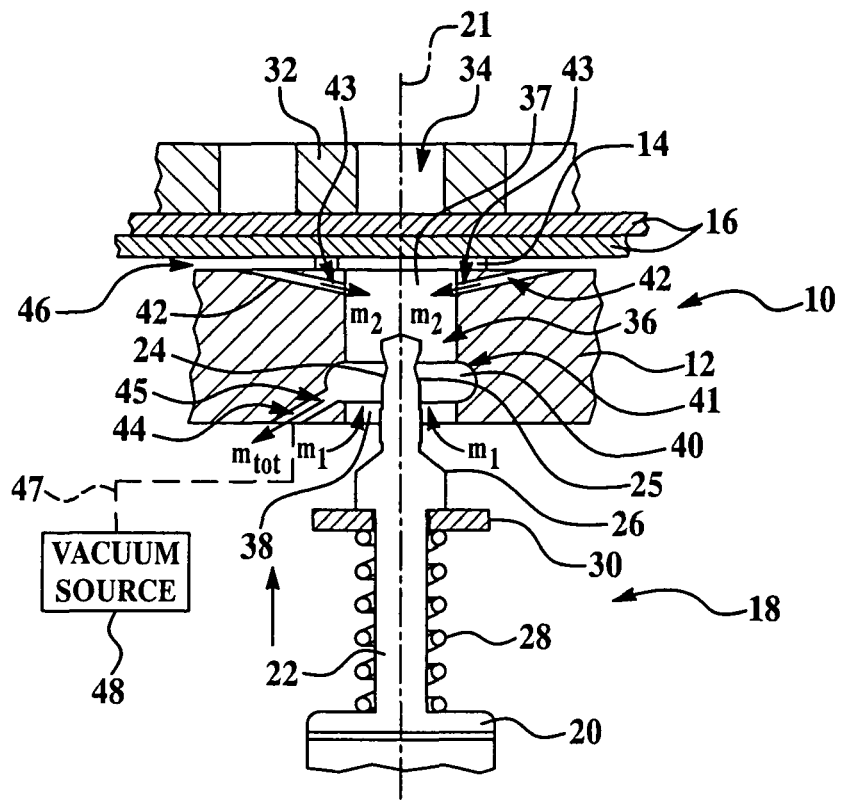
FIG. 1 is a fragmentary, cross sectional view of a semi-automatic drill clamped to a workpiece on which a drilling operation is to be performed, the cutter being shown in its retracted position.

Referring first to FIG. 1, a portable machine tool generally indicated by the numeral 18 is temporarily attached to a workpiece 16 by means of an electromagnetic clamp generally shown by the numeral 10. In the illustrated example, the machine tool 18 comprises a drill which includes a drill motor 20 that drives a shank 22 for rotation. A cutter 24 is mounted on the end of the shank 22 and includes a twist drill 25 portion and a tapered cutter portion 26 for producing a countersink in the workpiece 16 surrounding the hole produced by the drill 25. The machine tool 18 and the electromagnetic clamp 10 are mounted on a common, portable tool fixture (not shown). The drill motor 20 includes an internal, linear feed mechanism (not shown) which feeds the cutter 24 along a central axis 21 between the retracted position shown in FIG. 1 and displaced, cutting positions which will be discussed below. A ring shaped disc 30 is loosely sleeved over the shank 22 and is biased into engagement with a shoulder on the cutter by a compression spring 29 passing over the shank 22. As will be discussed later, the disc 30 functions as a closure to control airflows that extract debris produced by the cutter 24.

In the present example, the workpiece 16 comprises a pair of metal sheets in which a countersunk hole is to be formed which will receive a fastening rivet (not shown). A backing plate 32 of rigid material such as steel is placed on the back side of the workpiece 16 prior to the drilling operation in order to provide workpiece support during the drilling operation. The backing plate 32 includes a through hole 34 aligned with the central cutter axis 21 in order to allow the cutter 24 to freely pass through the backing plate 32 at the end of the drill stroke.

The electromagnetic clamp 10 includes an electromagnet body 12 connected to an electrical power source (not shown), causing the body 12 to act as an electromagnet which clamps itself to the metallic workpiece 16. Where the workpiece 16 is formed of non-metallic plates or pieces, then the steel backing plate 32 completes the magnetic circuit required to produce the necessary clamping force.

The magnetic clamping force is concentrated through a clamping ring 14 secured to body 12, which surrounds a central passageway 36 extending through the clamp body 12. The clamping ring 14 holds the body 12 in spaced relationship to the workpiece 16 so as to form a gap 46 between body 12 and workpiece 16. In addition to concentrating the magnetic clamping force, the clamping ring 14 forms a seal between the body 12 and workpiece 16 so that cutting debris from the workpiece 16 cannot escape other than through the passageway 36.

In the present example, passageway 36 is a cylindrically shaped through-hole. The upper end of passageway 36 functions as a mixing chamber 37 wherein a later discussed supply of fluid is mixed with the cutter debris to improve its flow characteristics. The lower end of the passageway 36 includes a section of increased diameter that defines an acceleration chamber 40 having a curved outer curved sidewall 41. The end of the passageway 36 opposite the workpiece 16 includes an inlet opening 38 surrounding the shank 22. The inlet opening 38 allows the cutter 24 to pass into the passageway 36 and also permits a relatively large volume of air to enter the passageway 36.

The body 12 includes fluid supply channels 42 which extend from one side of the body 12, laterally inwardly and communicate with the passageway 36 through inlets 43. In the illustrated example, two, opposing fluid supply channels 42 are provided, however more or less than this number of channels may be provided, depending upon the particular application, geometries, fluid flow rate and other factors. The body 12 further includes a debris and fluid exhaust channel 44 which extends from the other side of the body 12 and communicates with the acceleration chamber 40 through an exhaust outlet 45 in the sidewall 41. The exhaust channel 44 is connected by a pneumatic line 47 to a source of negative pressure, such as the vacuum source 48 which, as will become later apparent, extracts fluid and debris through the exhaust channel 44.

With the cutter 24 in its fully retracted position as shown in FIG. 1, the drill motor 20 is turned on and the cutter rpm and feed rate are selected. The vacuum source 48 is turned on which draws fluid out of the clamp body 12 through the exhaust channel 44. In the illustrated embodiment, the fluid comprises ambient air surrounding the clamp 10. The air being drawn out through the exhaust channel 44 is derived from airflow $m_1$ which enters the passageway 36 through the inlet opening 38 surrounding the cutter 24. At this point, the air flow $m_2$ entering the passageway through supply channels 42 is essentially zero.

Figure 2:
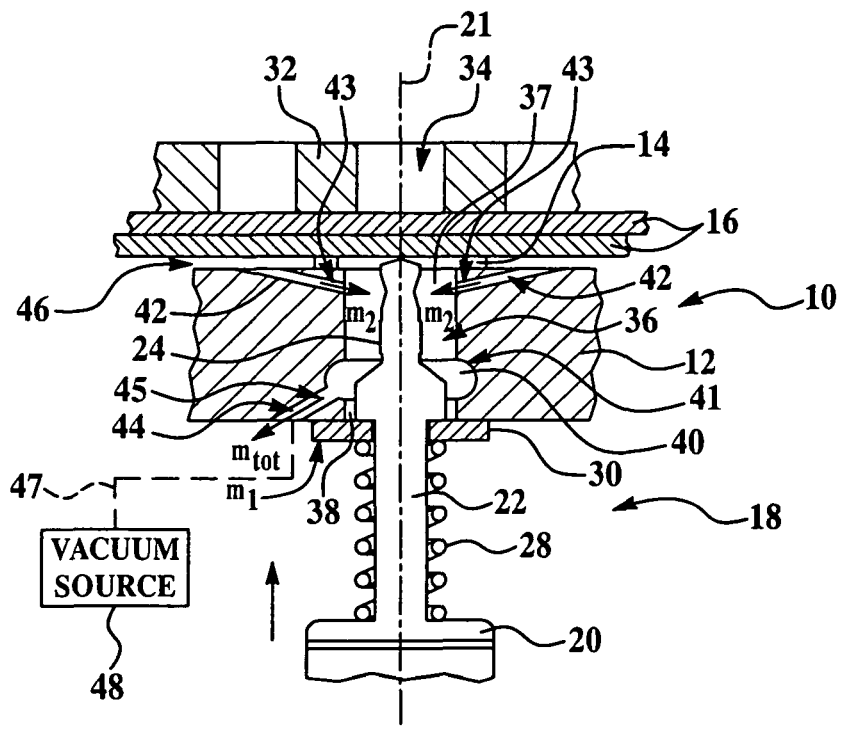
FIG. 2 is a view similar to FIG. 1, but showing the cutter having shifted to its cutting position in preparation for drilling the workpiece, and depicting a disk carried by the cutter closing off a passageway in the clamp.

FIG. 2 shows the cutter 24 having advanced in its feed stroke to contact the workpiece 16. During this feed stroke, the disc 30 moves into engagement with the outer face of the clamp body 12, covering the inlet opening 38 in its entirety. The spring 28 holds the disk 30 on the outer face of clamp body 12 while the cutter 24, along with shank 22, continue being displaced toward the workpiece 16. When the disc 30 closes off the inlet opening 38, airflow $m_1$ into the passageway 36 goes to zero, and the airflow $m_2$ through supply channels 42 shifts to a high rate so that the total airflow $m_{tot}$ being exhausted is equal to the supply airflow $m_2$.

Figure 3:
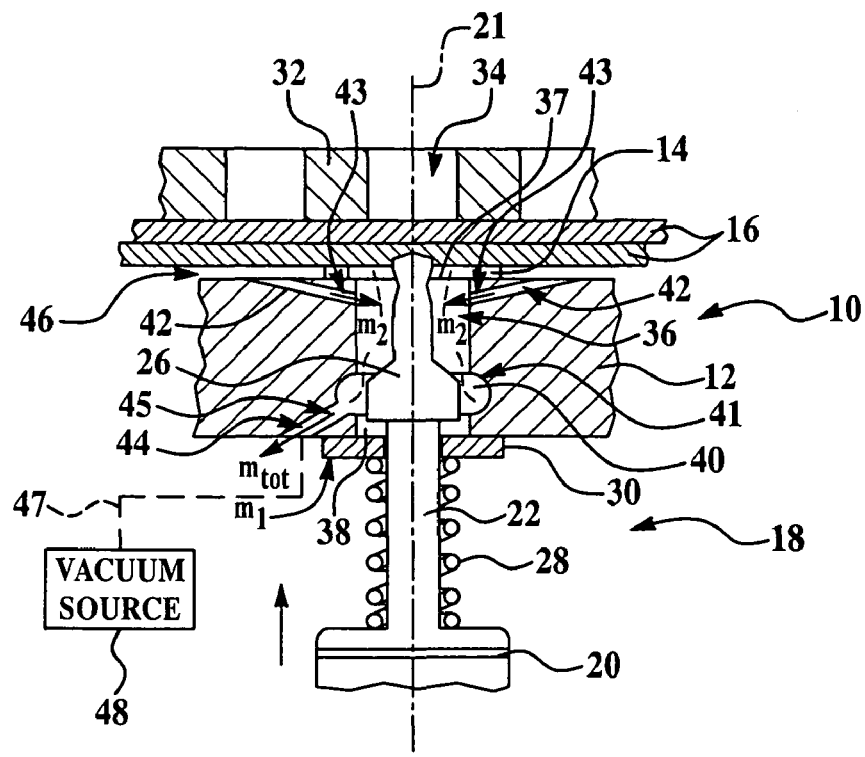
FIG. 3 is a view similar to FIG. 2, but showing the initial stage of the drilling operation in which the cutter has partially penetrated the workpiece.
Figure 4:
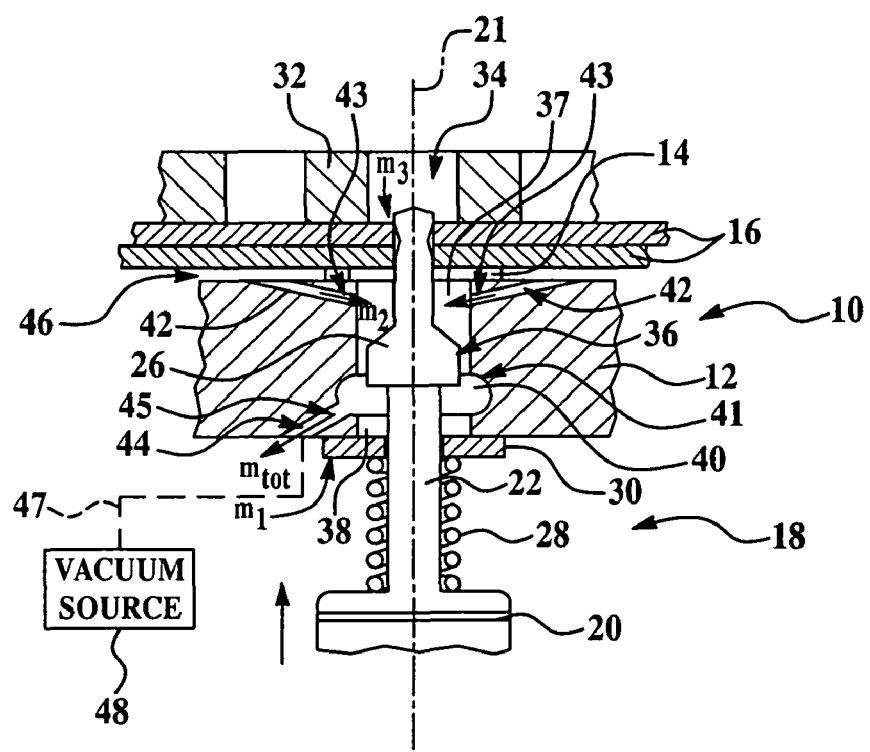
FIG. 4 is a view similar to FIG. 3, but showing the cutter having penetrated the workpiece, completing the hole drilling portion of the cutting operation.

FIG. 3 shows the twist drill portion 25 of cutter 24 having partially penetrated the workpiece 16, resulting in cutter debris being generated at the interface between the twist drill 25 and workpiece 16. The airflow $m_2$ draws the debris into the mixing chamber 37 where it becomes mixed with the incoming air before passing into the acceleration chamber 40. The flow of the air-debris mixture in chamber 40 circulates around the outside area of the chamber 40 in a cyclonic fashion due in part to the curved shape of the sidewall 41 and the fact that the exhaust outlet 45 is positioned in the side wall 41. In the condition shown in FIG. 3, airflow $m_1$ continues to be zero, the airflow $m_2$ is at its highest rate, and the total exhaust airflow $m_{tot}$ is equal to airflow $m_2$ FIG. 4 shows the twist drill portion 25 having fully penetrated the workpiece 16, thus completing the hole drilling portion of cutting operation. As the twist drill 25 penetrates through the workpiece 16, ambient air within the backing plate opening 24 flows through the flutes/helicoils of the cutter 24, producing an additional source of airflow $m_3$ into the passageway 36. In the condition shown in FIG. 4, airflow $m_1$ remains zero while both airflows $m_2$ and $m_3$ are at high rates. Consequently the total exhaust flow $m_{tot}$ is the sum of airflows $m_2$ and $m_3$. As will be discussed later, the additional airflow $m_3$ through the newly formed hole increases the total volume of air through the passageway 36, but decreases the flow velocity. In accordance with the present invention, the velocity of the air flowing through the passageway 36 must be sufficient to reliably carry the debris to the exhaust channel 44. Accordingly, depending on the particular application and size/geometries of the various features, it may be necessary to partially or even fully close the supply channels 42, which will result in a corresponding increase the velocity of airflow through the passageway 36.

Figure 5:
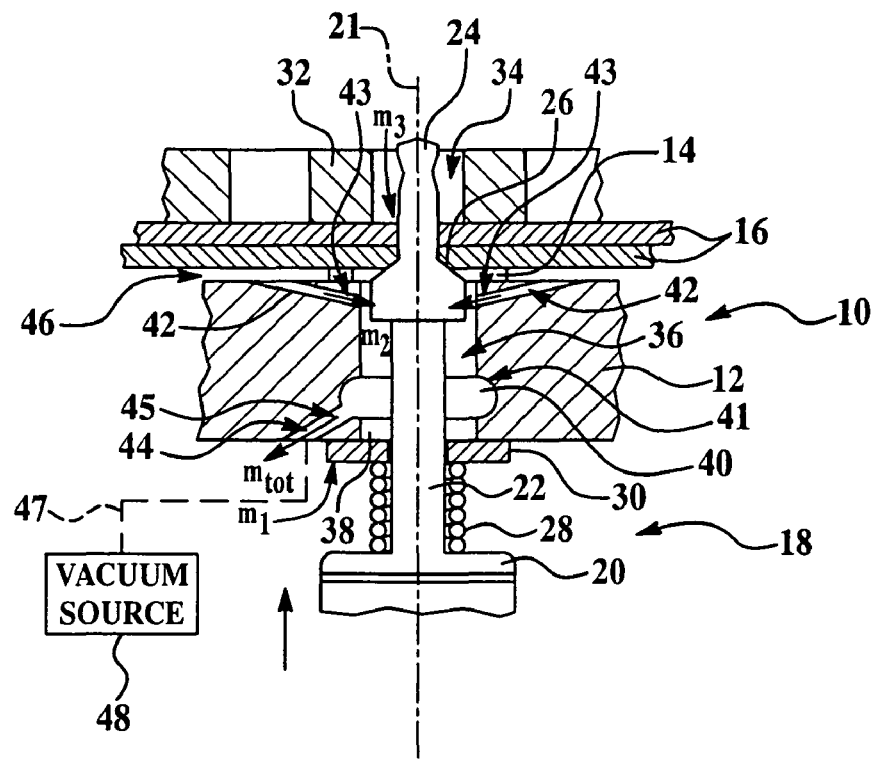
FIG. 5 is a view similar to FIG. 4, but showing the cutter having advanced to the end of its stroke where a countersinking operation is performed.

FIG. 5 shows the cutter 24 having advanced further in its stroke, with the tapered section 26 forming a countersink in the hole that has just been drilled. During this countersinking operation, airflow $m_1$ remains zero while both $m_2$ and $m_3$ remain high so that the total airflow exhausted from the chamber continues to be the sum of airflows $m_2$ and $m_3$. The airflow $m_3$ carries dust and debris in the flutes and helicoils of the cutter 24 into the passageway 36 where the additional airflow $m_2$ entering the passageway chamber 36 through inlets 43 is combined with the debris in the mixing chamber 37. Following mixing in the chamber 37, the mixture passes into the acceleration chamber 40 where it is accelerated before being extracted through the exhaust channel 44.

Figure 6:
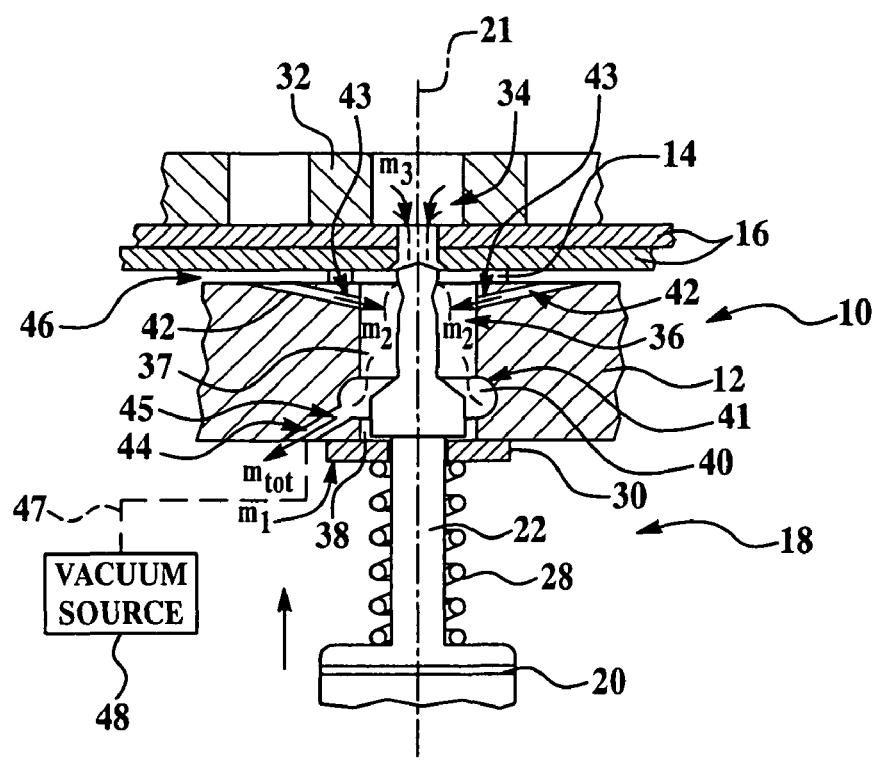
FIG. 6 is a view similar to FIG. 5 but showing the cutter having been partially retracted from the end of its stroke.

FIG. 6 shows the cutter 24 during the first part of its retraction stroke. Airflow $m_2$ and $m_3$ remain high, while airflow $m_1$ remains zero. As the end of the drill twist 25 begins to clear the workpiece 16, airflow $m_3$ carries in any remaining debris and dust in the countersink hole into the passageway 36 where it is mixed with additional airflow $m_2$ and accelerated in chamber 40 before being exhausted through the exhaust channel 44.

Figure 7:
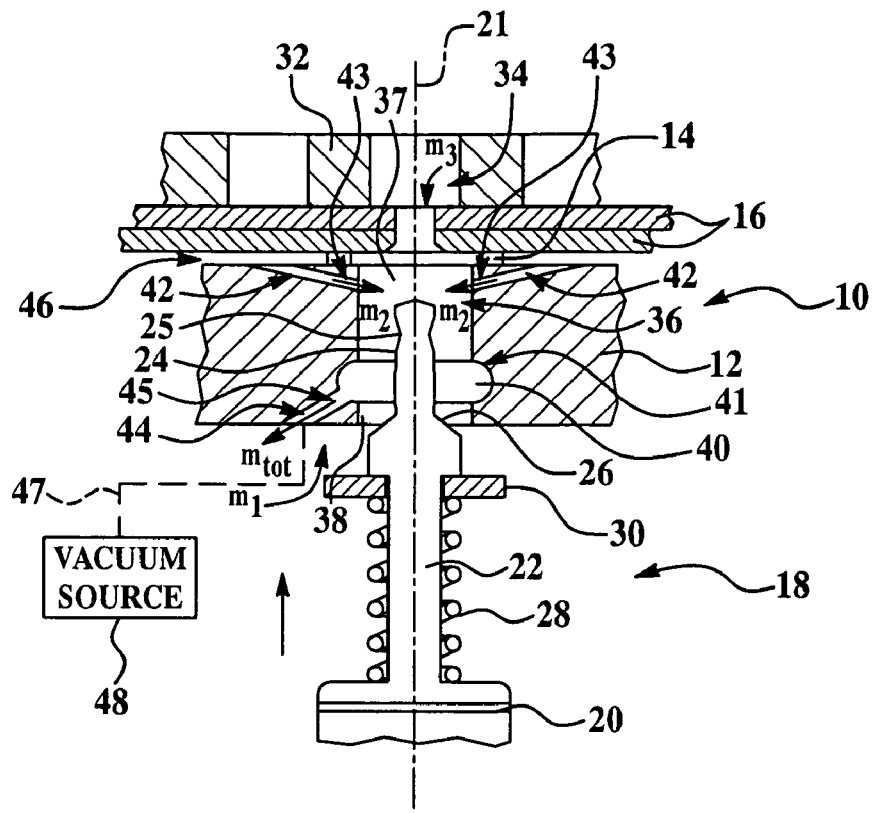
FIG. 7 is a view similar to FIG. 6 but showing the final phase of the drilling operation in which the cutter is returned to its fully retracted position.

As the cutter 24 continues its retraction stroke, the cutter 24 engages the disk 30, causing the latter to be displaced along with the cutter 24 away from the face of the clamp body 12. As the disk 30 moves away from the clamp body 12, the inlet 38 around the shank 22 is re-opened, thereby re-establishing airflow $m_1$. In the condition shown in FIG. 7, airflows $m_1$, $m_2$ and $m_3$ are all low so that the total exhaust flow $m_{tot}$ is equal to the sum of $m_1$, $m_2$ and $m_3$. This continuing airflow assures that the entire passageway 36 as well as the countersunk hole are fully cleared of dust and debris. The drilling operation having been completed, drill motor 20 is de-activated and the clamp 10 is removed from the workpiece 16.

From the forgoing, it can be appreciated that effective chip and dust extraction during the drilling process is achieved by generating controlled, high velocity, turbulent airflow in the mixing chamber 40 which moves and accelerates chips and dust through the exhaust channel 44. This controlled, high velocity turbulent airflow is created as a result of the disk 30 closing off a high volume airflow inlet 38, and allowing only a controlled amount of air into the mixing chamber 37 through relatively small air supply channels 42 and the flutes in drill twist 25. The amount of air flowing into the mixing chamber 37 during a cutting operation is further controlled by the exact geometry and size of the air supply channels 42.

As suggested above, the exact size of the mixing chamber 37, airflow passages 42, 44, 46, etc. will depend on the particular application, size of the machine tool 18, etc. Importantly, however, the velocity of the airflow passing through the mixing chamber 37 must be controlled in order to successfully remove the debris when the maximum amount of debris is being generated, as occurs during the cutting operations shown in FIGS. 4, 5 and 6. For example, during the drilling operation depicted in FIG. 3 (when the hole is not yet finished), it can be seen that only airflow $m_2$ is entering the mixing chamber 37, and the entry channel cross section is optimized for achieving high air velocity. As soon as the hole drilling is complete (as shown in FIGS. 4 & 5), additional air $m_3$ enters the mixing chamber 37, thereby reducing the air velocity in the mixing chamber 37, and thus the ability to effectively remove all debris. Therefore, to maintain the necessary high air velocity in the mixing chamber 37, it may be necessary to close the $m_2$ air entry ports 42 (in addition to the $m_1$ inlet opening 38), so that the only source of air entering the mixing chamber 37 is the $m_3$ airflow from the workpiece hole.

Figure 8:
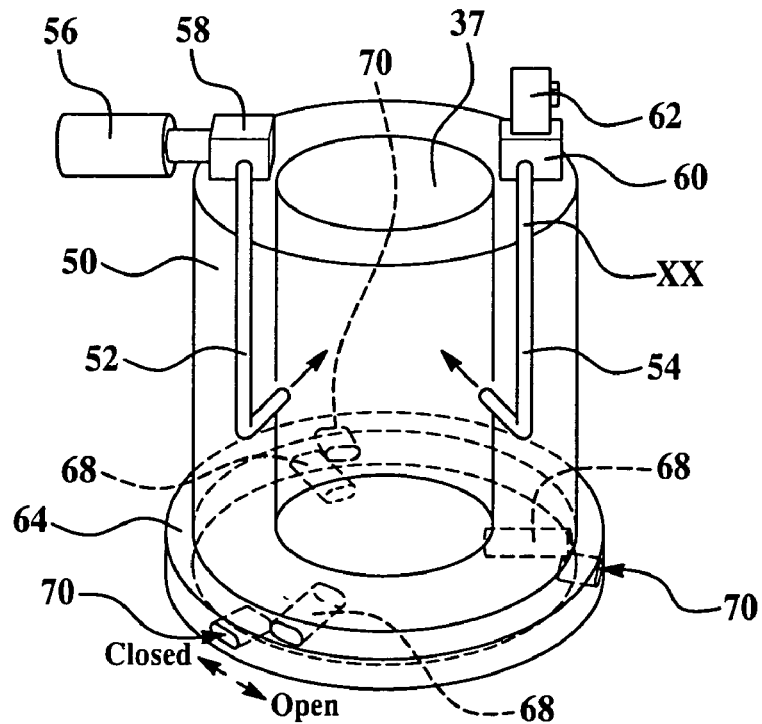
FIG. 8 is a simplified, perspective view of airflow control devices used to control the velocity of the air passing through the mixing chamber.

A variety of devices and construction features can be devised to control the airflow so that the requisite airflow velocity is maintained in the mixing chamber 37 at the necessary times. An example of one such construction is shown in FIG. 8. A body 50, which may be part of a workpiece clamp, has a cylindrical central opening defining the mixing chamber 37. Tubes 52, 54 supply airflow $m_2$ to the mixing chamber 37. The airflow $m_2$ can be shut off by closing valves 58, 60 controlled by either a solenoid 56 or a mechanical switch 62. Alternatively, the airflow $m_2$ can be supplied to the mixing chamber 37 using a first set of lateral air entry ports 68 formed the wall of body 50, and a second set of air entry ports 70 formed in a rotatable ring 64 that surrounds the body 50. When the two sets of air entry ports 68, 70 are aligned, maximum airflow is allowed to enter the mixing chamber 37 through these ports. However, as the ring 64 is rotated relative to the body 50, the overlapping cross sectional area of the connected ports 68, 70 decreases until the ports 68, 70 are fully closed off, terminating the airflow $m_2$.

Although this invention has been described with respect to certain exemplary embodiments, it is to be understood that the specific embodiments are for purposes of illustration and not limitation, as other variations will occur to those of ordinary skill in the art.

What is claimed is:

1. A device for removing cutting debris produced by a cutting tool performing cutting operations on a workpiece, comprising:
   a clamping member of electromagnetic body for clamping the tool to the workpiece; said clamping member having a through-hole therein defining a chamber, wherein one end of the through-hole defines one of the fluid inlets, and, said chamber in the clamping member for receiving debris produced by the cutting tool, the chamber allowing the cutting tool to pass therethrough during a cutting operation;

a clamping ring on one end of the clamping member surrounding the through-hole and engaging the workpiece, the clamping ring forming a seal between the clamping member and the workpiece;

fluid inlets communicating with the chamber for allowing fluid to enter the chamber; and, at least one outlet communicating with the chamber for allowing fluid and debris to exit the chamber.

2. The device of claim 1, further comprising a vacuum source coupled with the outlet for drawing the debris and fluid out of the chamber through the fluid outlet.

3. The device of claim 1, wherein the fluid inlets include:
a first fluid inlet at one end of the chamber adjacent the workpiece, and
a second fluid inlet at the opposite end of the chamber through which the cutting tool may pass into the chamber and toward the workpiece.

4. A method for removing cutting debris produced by a cutting machine tool held on a workpiece by a clamp, comprising the steps of:
(A) introducing a flow of fluid into a passageway in the clamp;
(B) moving a cutter on the machine tool through the passageway into cutting engagement with the workpiece, increasing the velocity of the fluid flowing through the passageway when the cutter moves into cutting engagement with the workpiece by reducing the area of inlets allowing fluid to enter the passageway resulting in cutting debris entering the passageway; and,
(C) exhausting fluid and cutting debris from the passageway through a channel in the clamp.

5. The device of claim 1, wherein the clamping member includes a body and a clamping ring on one end of the body for engaging the workpiece, the clamping ring surrounding an end of the chamber and holding the body in spaced relationship to workpiece to form a gap between the body and the body and the workpiece.

6. The device of claim 5, wherein the fluid inlets are in fluid communication with the gap.

7. The device of claim 1, wherein the chamber is generally cylindrical and includes an enlarged diameter portion encouraging cyclonic flow of the fluid and debris before exiting the chamber.

8. The device of claim 7, wherein the at least one outlet is in fluid communication with the enlarged diameter portion.

9. The device of claim 1, wherein the chamber includes first and second opposite open ends, and the device further comprises a closure for closing one end of the chamber during a cutting operation to increase the velocity of fluid exiting the chamber.

10. The device of claim 9, wherein the closure includes a disc mounted for movement with the cutting tool toward and away from the clamping member.

11. A debris removal system for use with cutting tools, comprising:
a clamp for clamping the tool to a workpiece;
a passageway through the clamp, the passageway communicating with the surface of the workpiece where a cutting operation is to be performed and including a chamber for receiving debris produced by a cutting operation;
passageway includes a cylindrical bore in the clamp through which a cutting tool may pass during a cutting operation;
first and second fluid inlets in the passageway for allowing fluid to enter the chamber;
a closure carried with the cutting tool for closing the first fluid inlet during a cutting operation to increase the velocity of fluid and debris being exhausted from the chamber through the exhaust outlet;
an exhaust outlet in the passageway for allowing fluid and debris to exit the chamber; and,
a vacuum source coupled with the exhaust outlet for exhausting fluid and debris from the chamber.

12. The method of claim 4, wherein step (A) is performed by sucking fluid into the passageway from a channel in the clamp.

13. The method of claim 4, further comprising the step of:
(D) mixing the fluid and the cutter debris in a chamber within the passageway before being exhausted in step (C).

14. The debris removal system of claim 11, wherein:
the first inlet is formed by an opening in the clamp through which the cutting tool passes during a cutting tool stroke, and
the closure includes a disc movable with the cutting tool for engaging the clamp and closing off the first inlet.

15. The debris removal system of claim 14, wherein the closure includes a spring for urging the disc against the clamp.

16. The debris removal system of claim 11, wherein the chamber is generally cylindrical and includes an enlarged diameter portion for accelerating the flow of the fluid and debris before being exhausted from the chamber.

17. The cutting debris removal system of claim 11, wherein the second inlet communicates with an outer face of the clamp.

18. A cutting debris removal system for a portable machine tool having a workpiece cutter, comprising:
a clamp for clamping the portable machine tool to the workpiece;
the clamp includes a side facing and spaced from the workpiece to form a gap between the clamp and the workpiece, and, the fluid supply channel communicates with the gap; the clamp includes a ring surrounding one end of the passageway for sealing the gap from the chamber;
a passageway in the clamp through which the cutter may pass between a retracted position and a cutting position engaging the workpiece, the passageway including a chamber for receiving debris produced by the cutter;
at least one fluid supply channel in the clamp communicating with the chamber for supplying fluid to the chamber;
at least one fluid exhaust channel in the clamp communicating with the chamber for allowing fluid and debris to be exhausted from the chamber during a cutting operation; and,
a pressure source for exhausting fluid from the chamber through the exhaust channel.

19. The cutting debris removal system of claim 18, wherein the chamber includes a first section for mixing fluid with the debris, and a second section for accelerating the flow of the fluid and debris before passing into the exhaust channel.

20. The method of claim 4, further comprising the step of:
(D) creating a cyclonic flow of the fluid and debris within the passageway.

21. The method of claim 4, wherein step (A) includes directing a flow of fluid laterally into the passageway.

22. The cutting debris removal system of claim 18, wherein the clamp includes an electromagnet body.

23. The cutting debris removal system of claim 18, further comprising a second fluid supply channel in the clamp opposite the first fluid supply channel and communicating with the chamber for supplying fluid to the chamber.

24. The cutting debris removal system of claim 18, wherein the clamp includes an outer opening defining one end of the passageway through which the cutter may pass, and the system further comprises a closure for sealing the outer opening when the cutter is in its cutting position.

25. The cutting debris removal system of claim 24, wherein the closure includes a disc surrounding the cutter, the disc being movable into engagement with the clamp when the cutter moves from its retracted position to its cutting position.

26. The cutting debris removal system of claim 25, including a spring for biasing the disc against the clamp.

27. The cutting debris removal system of claim 18, wherein the pressure source includes a source of negative pressure coupled with the fluid exhaust channel.

28. The method of claim 4, wherein step (C) includes directing the fluid and debris laterally away from the passageway.

29. The method of claim 4, further comprising the step of:
(D) controlling the flow of the fluid flowing though the passageway such that the velocity of the fluid flow is sufficient to move the debris through the passageway into the channel.

30. The method of claim 4, wherein the workpiece is a aircraft component.

31. The method of claim 4, wherein the workpiece is an outer skin of an aircraft, and the debris is produced by drilling a rivet hole in the skin.

* * * * *